W. R. SMITH.
SPRING CONSTRUCTION.
APPLICATION FILED JULY 30, 1909.
975,579.
Patented Nov. 15, 1910.
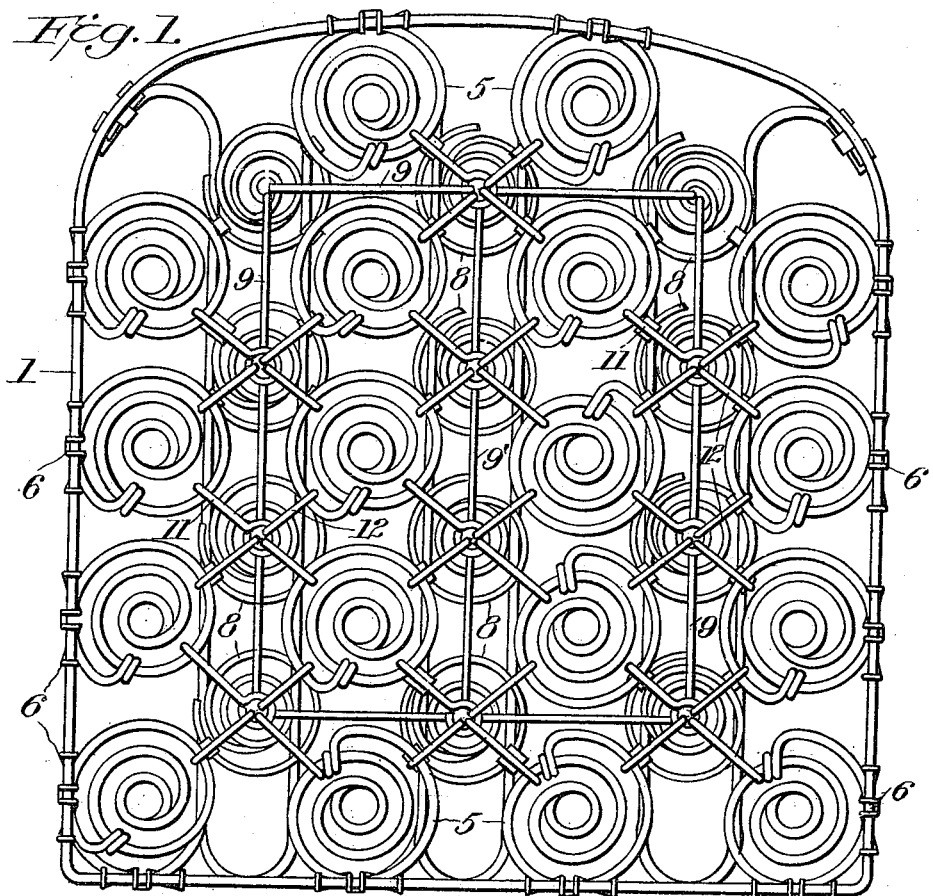
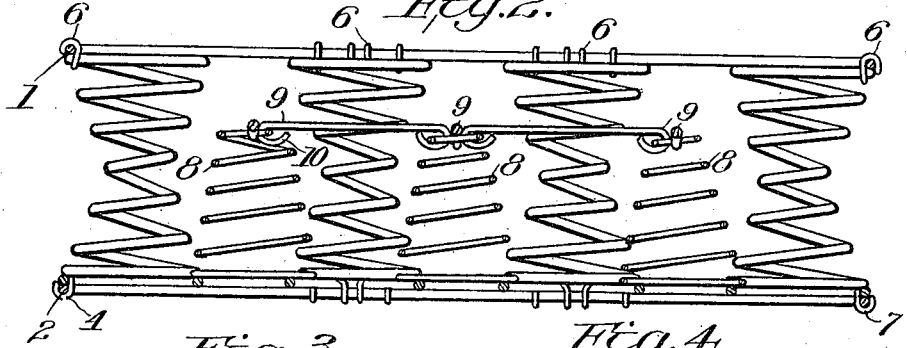
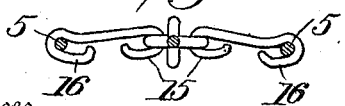

UNITED STATES PATENT OFFICE.

WATSON R. SMITH, OF JACKSON, MICHIGAN, ASSIGNOR TO JACKSON CUSHION SPRING CO., OF JACKSON, MICHIGAN.

SPRING CONSTRUCTION.

975,579.  Specification of Letters Patent.  Patented Nov. 15, 1910.

Application filed July 30, 1909. Serial No. 510,476.

*To all whom it may concern:*

Be it known that I, WATSON R. SMITH, a citizen of the United States, residing at Jackson, in the county of Jackson and State of Michigan, have invented certain new and useful Improvements in Spring Constructions, of which the following is a specification.

This invention relates to spring constructions, particularly those adapted for automobile, car and other seats.

One object of the present invention is to so connect the auxiliary springs together as to prevent the same becoming entangled with one another or with the main springs and yet permit of such individual action of each auxiliary spring as will provide for an efficient operation thereof.

Another object of the invention resides in the provision of a spring construction embodying auxiliary springs of less height than the main springs for the purpose of coöperating with the latter to catch or sustain any extra weight brought to bear upon the structure, there being an auxiliary frame disposed within the main frame of the structure and composed preferably of links having connection with the upper convolutions of the auxiliary springs for maintaining the latter in proper position with respect to one another and with the main springs for an efficient operation of the structure.

A still further object of the invention resides in the provision of a spring construction embodying such characteristics that the main springs may be connected together, as may also the auxiliary springs, to permit of individual action of the springs and have the connections between the main springs so constructed and arranged that they will not become entangled with one another or one or more of the connecting elements so displaced as to cause undue strain upon the springs or result in any undue unevenness in the top of the structure.

A still further object of the invention is to provide what is known as a continuous construction, as regards the main springs and yet permit individuality of the main springs, rendering the structure soft and pliable and yet so connecting the main springs at their upper ends that when they are compressed to a certain degree they will begin to pull other main springs into action.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a plan view of the invention. Fig. 2 is a transverse sectional view. Fig. 3 is a view on the line *a—a* of Fig. 1. Fig. 4 is a detail perspective view of the main connecting link of the main springs.

Referring now more particularly to the accompanying drawings, the reference characters 1 and 2 indicate upper and lower edge wires, respectively, which constitute the main frame of the structure, there being a continuous supporting wire 3 connected to the lower edge wire 2 by means of any suitable type of clips 4 upon which are mounted the main springs 5. The marginal main springs 5 are secured at their upper ends to the upper edge wire 1 in any suitable manner, preferably by means of suitable clips 6, and at their lower end to the lower edge wire by means of suitable clips 7.

Disposed within the main frame of the structure and upon the same supporting wires which support the main springs is a plurality of auxiliary springs 8, which are shorter than the main springs and designed for the purpose of catching or sustaining extra weight brought to bear upon the structure. These auxiliary springs are shown as conical shaped, but this is immaterial, as is also the fact that they are shown of lighter gage wire than the main springs. In any event, the auxiliary springs are preferably connected together by means of links 9, the links 9 each having a hook 10 at each end for engagement in the upper convolution of the corresponding auxiliary springs. These links 9 which connect the auxiliary springs are so arranged that they constitute a sectional and flexible auxiliary frame which does not have operative action in the structure until the auxiliary springs act, because of the fact that the auxiliary frame is free and independent of the main frame and also of the main springs of the structure. By forming the auxiliary frame in sections, that is, by the links 9, there is some individuality of action of one auxiliary spring with relation to another, and yet, at a certain point in compression of the auxiliary springs, the adjacent links or parts of the auxiliary frame are brought into play to operate corresponding adjacent auxiliary springs; hence the advantage of the sectional, flexible auxiliary frame. The interior auxiliary springs are connected by the links 9', which latter are connected at their outer ends to the links forming the auxiliary frame.

The main springs 5 are preferably connected together at their upper ends for the purpose of providing a continuous top surface and to hold the springs in true relation with regard to one another and yet not interfere with individual action of said springs. The method of accomplishing these purposes, as shown in the present instance, consists of a link 11 and a plurality of auxiliary links 12, the main link 11 being bent at its outer end to provide an elongated eye 13 for slidable engagement with the upper convolution of one of the main springs 5 and at its opposite end bent to provide a substantially circular eye 14 disposed in a plane at a direct right angle to the plane of the eye 13. This eye 14 of the main link is formed integral with the main link and the inner ends of the auxiliary links 12 are provided with elongated eyes 15, so that the inner end of the links 12 may have slidable engagement with the eye 14 of the main link. The outer ends of the auxiliary links 12 are bent to provide elongated eyes 16 to embrace the upper convolutions of the corresponding main springs 5 and to have slidable engagement therewith, whereby the main springs all have individual action by virtue of the slidable means between them and the links 11 and 12 without permitting such lateral play of the springs as to cause them to become entangled with one another.

The eye 14 of the main link 11 is formed integrally with the main link 11 for the purpose of preventing such movement of the eye 14 as would likely cause entangling of the inner ends of the links 11 and 12. If the links 11 were formed the same as the links 12, and all of the links thus formed connected in a separable eye instead of in the integral eye 14 of the main link 11, there would be a possibility of the auxiliary links sliding upon the separable eye, resulting in buckling of the links, causing the separable eye under certain conditions to assume a vertical or perpendicular position, resulting in a serious defect in the structure and causing an unnecessary unevenness in the top surface of the spring structure. In the present instance, however, the eye 14 cannot slide around within the inner ends of the links, but remains stationary with relation to the links. Moreover, while the main springs 5 may have individual play at their upper ends by virtue of the slidable connection between them and the links, the links normally assume their true perpendicular position and the same may be said as regards the auxiliary springs by virtue of the slidable connections of the auxiliary frame links 9 with the upper convolutions of the auxiliary springs.

What is claimed is:—

1. In a spring construction, a frame, main springs in the frame, auxiliary springs arranged for coöperation with the main springs to catch and sustain extra weight, sets of links connected to the main springs, each set of main spring connecting links embodying one link provided with an integral eye with which the inner ends of the remaining links of each set engage.

2. In a spring construction, a frame, main springs in the frame, auxiliary springs arranged for coöperation with the main springs to catch and sustain extra weight, connections between the auxiliary springs, and sets of links connected to the main springs, each set of main spring connecting links embodying one link provided with an integral eye with which the inner ends of the remaining links of each set engage.

3. In a spring construction, a frame, springs in the frame, and sets of links connected to the springs, each set of links embodying one link provided with an integral eye with which the inner ends of the remaining links of each set engage.

In testimony whereof I affix my signature in presence of two witnesses.

WATSON R. SMITH.

Witnesses:
ERNEST D. McCUEN,
ETHEL M. PHELAN.